United States Patent [19]
Hughes et al.

[11] Patent Number: 6,018,763
[45] Date of Patent: Jan. 25, 2000

[54] HIGH PERFORMANCE SHARED MEMORY FOR A BRIDGE ROUTER SUPPORTING CACHE COHERENCY

[75] Inventors: John H. Hughes; Mark S. Isfeld, both of San Jose, Calif.

[73] Assignee: 3Com Corporation, Santa Clara, Calif.

[21] Appl. No.: 08/858,182

[22] Filed: May 28, 1997

[51] Int. Cl.$^7$ .......................... G06F 15/167; G06F 15/17
[52] U.S. Cl. ...................... 709/213; 709/249; 711/141; 395/500.45; 395/500.46; 395/500.48
[58] Field of Search ..................................... 709/213, 249, 709/200, 207, 234, 250; 395/200.43, 200.3, 500.45–48; 711/141; 710/57, 129

[56] References Cited

U.S. PATENT DOCUMENTS

| | | | |
|---|---|---|---|
| 5,483,640 | 1/1996 | Isfeld et al. | 709/249 |
| 5,592,622 | 1/1997 | Isfeld et al. | 395/200.02 |
| 5,809,533 | 2/1997 | Tran et al. | 711/141 |

OTHER PUBLICATIONS

Blumrich, et al., Virtual–Memory–Mapped Network Interfaces, IEEE, pp. 21–28, Feb. 1995.

*Primary Examiner*—Mark H. Rinehart
*Assistant Examiner*—William Titcomb
*Attorney, Agent, or Firm*—Wilson, Sonsini, Goodrich & Rosati

[57] ABSTRACT

An internetwork device manages the flow of packets of I/O data among a plurality of network interface devices. The internetwork device includes an I/O bus which is coupled to the plurality of network interface devices and a shared memory, for storing packets of I/O data and control structures needed by the plurality internetwork interface devices. The shared memory is also coupled to a processor bus, which connects to a processor and a processor memory. The processor memory is isolated from the shared memory, and is used for storing routines and internetworking information involved in routing packets of I/O data among the plurality of network interface devices. In this way, accesses between the processor and the processor memory are decoupled from accesses between the plurality of network interface devices. System performance is improved by storing copies of items from the shared memory in a processor cache located near the processor. Consistency rules are enforced between items in the shared memory and copies of the items in the processor cache through communications across the processor bus. Communications across the processor bus to enforce consistency rules are minimized by maintaining a shadow tag store near the shared memory, which keeps track of the items from the shared memory which are copied in the processor cache. Communications to enforce consistency rules only take place if the shadow tag store indicates that the processor cache contains an item of data from the shared memory which has been read from or written to.

80 Claims, 9 Drawing Sheets

| Op | S_0a | S_0b | S_1a | S_1b | CB | Proc | DMA | Bus Op | Tg/S/T | M | R | S | MBus | BusOpComment |
|---|---|---|---|---|---|---|---|---|---|---|---|---|---|---|
| 1 | --- | --- | --- | --- | --- | Ld10 | | Read | 10/a/N | P | 0 | 0 | Rd10 | Add new |
| 2 | 10/e | --- | --- | --- | --- | Ld21 | | Read | 21/a/N | P | 0 | 0 | Rd21 | Add new |
| 3 | 10/e | --- | 21/e | --- | --- | Ld30 | | Read | 30/b/N | P | 0 | 0 | Rd30 | Add new |
| 4 | 10/e | 30/e | 21/e | --- | --- | ST17 | | RWITM | 17/b/N | P | 0 | 0 | Rd17 | Add new |
| 5 | 10/e | 30/e | 21/e | 17/m | --- | St21 | | | | | | | | |
| 6 | 10/e | 30/e | 21/m | 17/m | --- | ST33 | | RWITM | 33/b/C | P | 0 | 0 | Rd33 | Repl w/CA |
| 7 | 10/e | 30/e | 21/m | 33/m | 17 | | | WKill | 17/x/D | P | 0 | 0 | Wr17 | CB complete |
| 8 | 10/e | 30/e | 21/m | --- | --- | | Rd30 | Clean | 30 | D | 0 | 0 | Rd30 | Hits clean L1 |
| 9 | 10/e | 30/e | 21/m | --- | --- | Ld10 | | Read | 10/a/N | P | 0 | 0 | Rd10 | Repl |
| 10 | 10/e | 30/e | 21/m | --- | --- | | Rd40 | | | | | | Rd40 | Miss L1 |
| 11 | 10/e | 30/e | 21/m | --- | --- | Ld32 | | Read | 32/b/N | P | 0 | 0 | Rd32 | Repl |
| 12 | 10/e | 32/e | 21/m | --- | --- | | Wr10 | Flush | 10 | D | 0 | 0 | Wr10 | Hit clean L1, remove |
| 13 | --- | 32/e | 21/m | --- | --- | | Rd21 | Clean | 21 | D | 1 | 0 | | Hit dirty L1, retry |
| 14 | --- | 32/e | 21/m | --- | --- | | | WKill | 21/x/N | P | 0 | 0 | Wr21 | Proc snoop response |
| 15 | --- | 32/e | 21/e | --- | --- | | | Clean | 21 | D | 0 | 1 | Rd21 | Hit L1, now clean |
| 16 | --- | 32/e | 21/e | --- | --- | | Wr50 | | | | | | Wr50 | Miss L1 |
| 17 | --- | 32/e | 21/e | --- | --- | St50 | | RWITM | 50/a/N | P | 0 | 0 | Rd50 | Add new |
| 18 | 50/m | 32/e | 21/e | --- | --- | St44 | | RWITM | 44/b/N | P | 0 | 0 | Rd44 | Repl |
| 19 | 50/m | 44/m | 21/e | --- | --- | Ld32 | | Read | 32/a/C | P | 0 | 0 | Rd32 | Repl w/CB |
| 20 | 32/e | 44/m | 21/e | --- | 50 | | | Flush | 50 | D | 1 | 0 | | Hit CB buffer, retry |
| 21 | 32/e | 44/m | 21/e | --- | 50 | | Wr50 | WKill | 50/x/D | P | 0 | 0 | Wr50 | CB complete |
| 22 | 32/e | 44/m | 21/e | --- | --- | | | Flush | 50 | D | 0 | 0 | Wr50 | Miss L1/CB |

FIG. 9

| Op | S_0a | S_0b | S_1a | G_1b | CB | Proc | DMA | BusOp | Tg/S/T | M | R | S | Mbus | BusOpComment |
|----|------|------|------|------|-----|------|------|-------|--------|---|---|---|------|--------------|
| 1  | ---- | ---- | ---- | ---- |     | Ld10 |      | Read  | 10/a/N | P | 0 | 1 | Rd10 | Add new |
| 2  | 10/s | ---- | ---- | ---- |     | Ld21 |      | Read  | 21/a/N | P | 0 | 1 | Rd21 | Add new |
| 3  | 10/s | ---- | 21/s | ---- |     | Ld30 |      | Read  | 30/b/N | P | 0 | 1 | Rd30 | Add new |
| 4  | 10/s | 30/s | 21/s | ---- |     | St17 |      | RWITM | 17/b/N | P | 0 | 0 | Rd17 | Add new |
| 5  | 10/s | 30/s | 21/s | 17/m |     | St21 |      | Kill  | 21/x/N | P | 0 | 0 |      | Clean->Dirty |
| 6  | 10/s | 30/s | 21/m | 17/m |     | St33 |      | RWITM | 33/b/C | P | 0 | 0 | Rd33 | Repl w/CB |
| 7  | 10/s | 30/s | 21/m | 33/m | 17  |      |      | WKill | 17/x/D | P | 0 | 0 | Wr17 | CB complete |
| 8  | 10/s | 30/s | 21/m | ---- |     |      | Rd30 |       |        |   |   |   | Rd30 | L1 known clean |
| 9  | 10/s | 30/s | 21/m | ---- |     | Ld10 |      | Read  | 10/a/N | P | 0 | 1 | Rd10 | Repl |
| 10 | 10/s | 30/s | 21/m | ---- |     |      | Rd40 |       |        |   |   |   | Rd40 | Miss L1 |
| 11 | 10/s | 32/s | 21/m | ---- |     | Ld32 |      | Read  | 32/b/N | P | 0 | 1 | Rd32 | Repl |
| 12 | 10/s | 32/s | 21/m | ---- |     |      | Wr10 | Flush | 10     | D | 0 | 0 | Wr10 | Remove clean L1 |
| 13 | ---- | 32/s | 21/m | ---- |     |      | Rd21 | Flush | 21     | D | 1 | 0 |      | Hit dirty L1, retry |
| 14 | ---- | 32/s | 21/m | ---- |     |      |      | WKill | 21/x/D | P | 0 | 0 | Wr21 | Dirty->Invalid |
| 15 | ---- | 32/s | ---- | ---- |     |      |      | Flush | 21     | D | 0 | 0 | Rd21 | Miss L1 |
| 16 | ---- | 32/s | ---- | ---- |     |      | Wr50 |       |        |   |   |   | Wr50 | Miss L1 |
| 17 | ---- | 32/s | ---- | ---- |     | St50 |      | RWITM | 50/a/N | P | 0 | 0 | Rd50 | Add new |
| 18 | 50/m | 32/s | ---- | ---- |     | St44 |      | RWITM | 44/b/N | P | 0 | 0 | Rd44 | Repl |
| 19 | 50/m | 44/m | ---- | ---- |     | Ld32 |      | Read  | 32/a/C | P | 0 | 1 | Rd32 | Repl w/CB |
| 20 | 32/s | 44/m | ---- | ---- | 50  |      |      | Flush | 50     | D | 1 | 0 |      | Hit CB buffer, retry |
| 21 | 32/s | 44/m | ---- | ---- | 50  |      | Wr50 | WKill | 50/x/D | P | 0 | 0 | Wr50 | CB complete |
| 22 | 32/s | 44/m | ---- | ---- |     |      |      | Flush | 50     | D | 0 | 0 | Wr50 | Miss L1/CB |

FIG. 10

HIGH PERFORMANCE SHARED MEMORY FOR A BRIDGE ROUTER SUPPORTING CACHE COHERENCY

BACKGROUND

1. Field of the Invention

The present invention relates to computer systems for managing the routing of data through computer networks, and more particularly to an architecture which uses caches and multiple data channels to improve performance in bridging, routing, and gateway internetwork functions between a plurality of different types of networks.

2. Related Art

Internetwork devices, such as bridges, routers, and gateways often cause a significant bottleneck in communicating data through networks. When a number of high speed networks are connected to a single internetwork device, the processing resources of the internetwork device can be easily overwhelmed.

Techniques for managing the large volumes of data in such internetwork devices have been developed. One technique is to provide a very large memory to accumulate in-coming data, while the internetwork processor executes time-consuming procedures, which may delay the internetwork processor in routing packets of in-coming data. However, for high-throughput systems, a very large memory can be quite expensive. Furthermore, contention between the packet transfers and accesses by the internetwork processor to the memory to retrieve code and data limit the effectiveness of increasing memory size or processor power.

One solution is to provide a shared memory for storing packets of I/O data which are in transit through the internetwork device. The shared memory connects to an I/O bus and a processor bus. The processor bus accommodates transfers of code and data between the processor and a processor memory. The I/O bus accommodates packets of data which are in transit across the internetwork device. In this way, overall throughput of the internetwork device is improved by segregating transfers of code and data between processor and memory from transfers of the network packets flowing through the internetwork device. See U.S. Pat. No. 5,483,640, entitled SYSTEM FOR MANAGING DATA FLOW AMONG DEVICES BY STORING DATA AND STRUCTURES NEEDED BY THE DEVICES AND TRANSFERRING CONFIGURATION INFORMATION FROM PROCESSOR TO THE DEVICES, by inventors Mark S. Isfeld and Bruce W. Mitchell.

U.S. Pat. No. 5,483,640 discloses a system which employs a small external cache for I/O data located near the shared memory to improve system performance. However, rapidly increasing processor clock speeds make the performance gains from such a small external cache marginal. In order to achieve an increase in system performance commensurate with the increase in processor clock speeds, it is necessary to move the I/O data directly from shared memory into a faster processor-controlled cache. However, maintaining copies of I/O data from the shared memory in an processor-controlled cache can create consistency problems. If a copy of an item of I/O data is modified in the processor-controlled cache, the internetwork system must ensure that accesses to the unmodified version in the shared memory do not proceed until the modified version in the processor-controlled cache is copied back to the shared memory. This operation is commonly referred to as a flush. Conversely, when an item of I/O data is modified in the shared memory by an I/O device, the system must ensure that a copy of the item of I/O data inside the processor-controlled cache is either updated or invalidated.

In this way, a form of consistency known as coherency can be maintained between items of I/O data in the shared memory and copies of these items of I/O data in the processor-controlled cache through communications across the processor bus. However, this consistency traffic across the processor bus increases the load on the processor bus. This undercuts the purpose of separating the processor bus from the I/O bus in the first place, which is to reduce contention in the processor-to-memory data channel.

What is needed is a structure to enforce consistency rules between items of data in the shared memory and copies of these items of data in an processor-controlled cache while minimizing consistency traffic across the processor bus.

SUMMARY

The present invention provides an architecture for managing large amounts of data flow across an internetwork device, which greatly improves upon the performance and features available in prior art systems. As in the invention disclosed in U.S. Pat. No. 5,483,640, the instant invention uses a shared memory coupled to a processor bus and an I/O bus. However, the present invention minimizes consistency traffic on the processor bus using a technique we refer to as "cache shadowing," which operates by maintaining a tag store at the shared memory (also referred to as a shadow tag store). The shadow tag store contains a record of which items from shared memory are copied into the processor cache and whether the items have been modified in the processor cache. A consistency transaction is only sent over the processor bus during an access to an item in shared memory if the shadow tag store indicates that the processor cache contains a copy of an item.

During an I/O read operation to an item in the shared memory, if the item of data exists in the processor cache, and has been modified in the processor cache, then it is flushed to the shared memory before it is read from shared memory. If the item does not exist in the processor cache, or has not been modified in the processor cache, no consistency transaction takes place across the processor bus.

During a write operation by an I/O device to an item of data in the shared memory, a command is broadcast over the processor bus to invalidate a copy of the item in the processor cache only if the shadow tag store indicates that the processor cache contains the item.

Thus, the present invention can be characterized as an apparatus for managing data flow among a plurality of I/O devices. A first memory (or shared memory) stores I/O data in transit between the plurality of I/O devices. The first memory is coupled to and can be accessed by a first communication channel and a second communication channel. A processor with a first store is coupled to the first communication channel. The second communication channel is coupled to the plurality of I/O devices. An access controller connects together the first communication channel, the second communication channel and the first memory, and arbitrates accesses to the first memory by the first communication channel and the second communication channel. A tag store is coupled to the access controller, and stores tags containing identifying information about items of I/O data from the shared memory which are copied into the processor cache. Consistency logic, executing a set of consistency rules, is coupled with the access controller and the tag store. This consistency logic uses the tag store to determine whether to send a communication across the first communication channel to enforce the consistency rules in response to read and write operations to the first memory.

Another embodiment of the present invention includes a processor memory which is coupled to the processor bus, and which stores information and instructions used by the processor to manage data flow between the plurality of I/O devices. Traffic between the processor and the processor memory on the processor bus is thereby segregated from the I/O traffic on the I/O bus, and system throughput is increased.

According to another embodiment of the present invention, the apparatus includes a second processor with a cache for storing copies of I/O data from the shared memory. This second processor is also coupled to the processor bus. The tag store additionally contains tags with identifying information about items of I/O data from the shared memory which are copied into the cache of the second processor. The consistency logic additionally enforces consistency rules between items of I/O data in the shared memory and copies of items of I/O data in the cache of the second processor.

According to yet another embodiment of the present invention, the apparatus for managing data flow includes more than two processors, each of which includes an associated cache for storing copies of items of I/O data from the shared memory. These processors connect to the processor bus. The tag store includes identifying information about the items of I/O data from the shared memory which are copied into the associated caches of the more than two processors. Finally, the consistency logic enforces consistency rules between I/O data in the shared memory and copies of the I/O data in the associated caches of the more than two processors.

According to another aspect of the present invention, the I/O bus traffic consists primarily of network packets with header portions. Processor bus traffic includes the header portions of network packets as well as processor instructions and data.

According to another embodiment of the present invention, a level two (L2) cache is located on the processor bus. Another embodiment allows the L2 cache to be adjacent to the processor on its own bus. The L2 cache is a secondary cache, which sits between a primary cache, located in or near the processor, and the processor memory. In some embodiments of the present invention, the L2 cache stores items of I/O data from the shared memory as well as instructions and data used by the processor to manage the flow of data between plurality of I/O devices. In other embodiments of the present invention, the L2 cache stores only the instructions and data used by the processor.

According to another aspect of the present invention, a write operation from the plurality of I/O devices to an item of I/O data in the shared memory generates a communication on the processor bus to invalidate or update an item in a processor cache only when the tag store indicates that the processor cache includes a copy of the item.

According to another aspect of the present invention, a read operation from the plurality of I/O devices directed to an item of I/O data in the shared memory generates a communication on the processor bus to flush an item from the processor cache back to the shared memory only when the tag store indicates that the processor cache includes a copy of the item which has been modified in the processor cache.

According to yet another aspect of the present invention, a write operation to an item of I/O data in the processor cache generates a communication across the processor bus, causing the consistency logic to update a corresponding tag in the tag store to indicate the item of I/O data has been modified in the processor cache.

According to another embodiment of the present invention, the consistency logic maintains complete consistency between items of I/O data in the shared memory and copies of these items in the processor cache.

Accordingly, the present invention provides an architecture for an internetworking system which increases system throughput by maintaining copies of items of I/O data in a fast processor cache, thereby increasing processing speed. The present invention additionally reduces the amount of processor bus traffic required to enforce consistency rules between items of I/O data in the shared memory and copies of these items of I/O data in the processor cache. The reduction in processor bus consistency traffic directly increases I/O bus throughput, because the I/O bus need not wait for as many consistency operations to complete. This translates to fewer I/O bus wait cycles, and higher average I/O bus throughput.

Other aspects and advantages of the present invention can be seen upon review of the figures, the description, and the claims which follow.

DESCRIPTION OF THE FIGURES

FIG. 9 is a flow chart of the sequence of operations which take place during a processor access to shared memory 200 in accordance with an aspect of the present invention.

DESCRIPTION

The following description is presented to enable any person skilled in the art to make and use the invention, and is provided in the context of a particular application and its requirements. Various modifications to the disclosed embodiments will be readily apparent to those skilled in the art and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
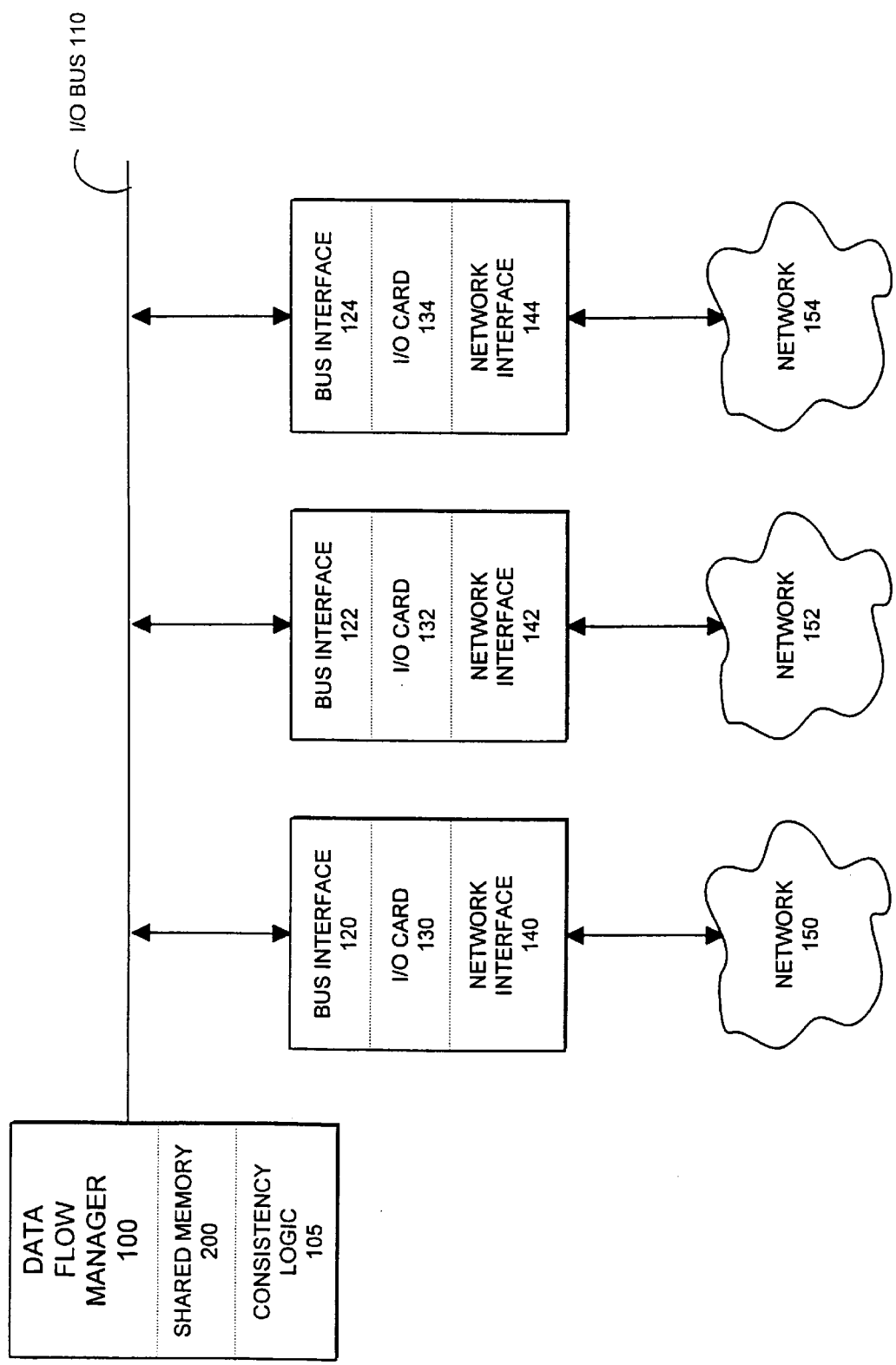
FIG. 1 is a diagram showing how a plurality of networks are connected together by an internetworking system in accordance with an aspect of the present invention.

FIG. 1 is a diagram showing how a plurality of networks are connected together according to one embodiment of the present invention. A plurality of network interface devices in the form of I/O cards 130, 132 and 134 are connected to I/O bus 110. More specifically, I/O card 130 connects to I/O bus 110 through bus interface 120. I/O card 132 connects to I/O bus 110 through bus interface 122. I/O card 134 connects to I/O bus 110 through bus interface 124. Bus interfaces 120, 122 and 124, are implemented with an application specific integrated circuit (ASIC) chip or chipset. Bus interfaces 120, 122 and 124, perform arbitration functions between I/O cards 130, 132 and 134 and I/O bus 110. They additionally support direct memory access (DMA) functions, allowing I/O cards 130, 132 and 134 to control I/O bus 110, and initiate to transfers across I/O bus 110. One embodiment of the present invention includes a plurality of I/O busses, such as I/O bus 110, which connect to a plurality of I/O devices, such as I/O cards 130, 132 and 134.

I/O cards 130, 132 and 134 include network interfaces 140, 142 and 144, respectively. Network interface 140 connects I/O card 130 with network 150. Network interface 142 connects network 152 with I/O card 132.

Network interface 144 connects network 154 with I/O card 134.

Network interfaces 140, 142 and 144 are representative of a plurality of different types of network interface devices which may be coupled to I/O bus 110. These devices typically include an intelligent network interface chip (circuit). For instance, a network interface may include an ILACC ethernet controller Am79C900, manufactured by Advanced Micro Devices, Inc., of Sunnyvale, Calif. A high speed serial network interface may include a Motorola MC68605 high speed serial controller manufactured by Motorola, Inc., of Phoenix, Ariz. A token ring interface may include a TMS380 token ring controller manufactured by Texas Instruments, Inc. A FDDI network module may include a 68839 FDDI controller manufactured by Motorola.

Data flow manager 100 connects to I/O bus 110 and manages the bridging, routing and gateway functions of the internetwork system according to one embodiment of the present invention. Internetwork traffic passing between networks 150, 152 and 154 generally passes through data flow manager 100. Data flow manager 100 includes shared memory 200 for storing data in transit between networks 150, 152 and 154, and consistency logic 105 for enforcing consistency rules between copies of data items in caches and memories within dataflow manager 100.

According to the present invention, a packet of I/O data from network 150 is transferred to network 152 as follows. The packet first passes from network 150 onto I/O card 130 through network interface 140. It then passes through bus interface 120 onto I/O bus 110, and then into shared memory 200 within data flow manager 100, where the message is temporarily stored while the header portion of the message is examined to determine the message's destination, and processed if necessary using multiprotocol routing functions. Next, the message is transmitted across I/O bus 110 through bus interface 122 to I/O card 132. Finally, the message is transferred across network interface 142 into network 152.

Figure 2:
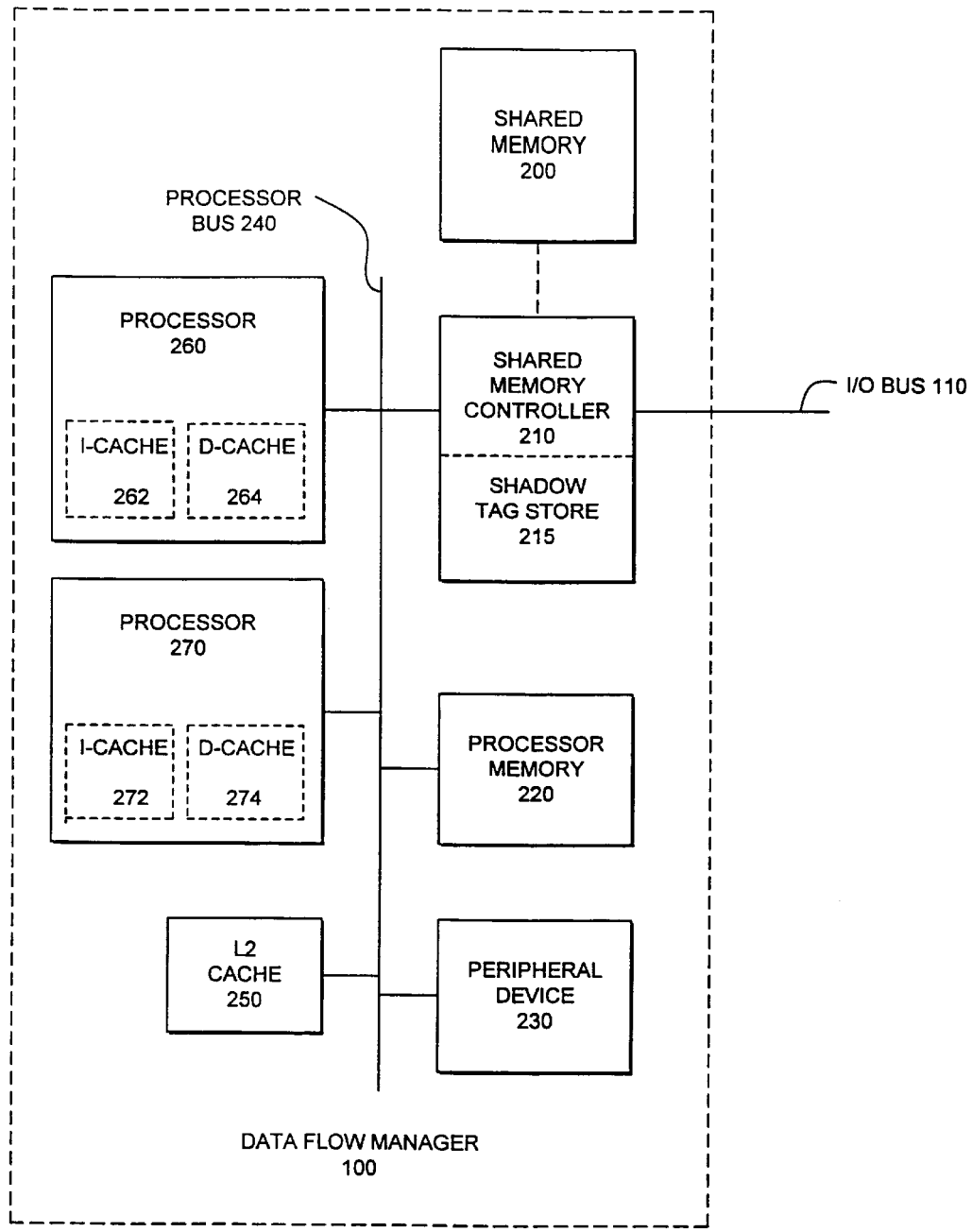
FIG. 2 is a block diagram of functional components of one embodiment of an internetworking system in accordance with an aspect of the present invention.

FIG. 2 is a block diagram of functional components of data flow manager 100 according to one embodiment of the present invention. Data flow manager 100 is connected as follows. Shared memory 200 connects to shared memory controller 210, which includes shadow tag store 215. Shared memory controller 210 additionally connects to processor bus 240 and I/O bus 110. Processor bus 240 connects to and links together processor 260, processor 270, L2 cache 250, processor memory 220 and peripheral device 230. In another embodiment, an L2 cache is directly connected to processors through a dedicated processor-to-L2 cache bus. If there are multiple L2 caches, multiple processor-to-L2 busses are provided to connect L2 caches to one or more processors.

One embodiment of the present invention uses two processors, processors 260 and 270. Processors 260 and 270 are operated in a processor/co-processor configuration in which one processor is primarily dedicated to performing the routing functions, and the other processor primarily performs compression, encryption and data movement functions. In another embodiment, both processors perform the routing functions. The architecture can also be extended to accommodate larger numbers of processors to provide even more processing power for the internetwork routing functions. The system can additionally operate with only a single processor 260. In this case, the routing, compression and encryption functions are all performed by the single processor 260.

Processors 260 and 270 include instruction and data caches. More specifically, processor 260 includes I-cache 262, for caching instructions, and D-cache 264, for caching data. Processor 270 includes I-cache 272, for caching instructions, and D-cache 274, for caching data.

In one embodiment of the present invention, processors 260 and 270 are Motorola PowerPC 604e RISC microprocessors. The Motorola 604e is a high performance, superscalar microprocessor, which allows as many as four instructions to be issued per clock cycle. The 604e includes a separate on-chip instruction cache and a separate on-chip data cache. Each of these caches are 32-K byte, 4-way set-associative caches which use an LRU replacement algorithm. These caches are programmable for write-back or write-through operation on a per page or per block basis. The caches may additionally be selectively disabled.

The data cache of the 604e supports a MESI cache protocol. Each 32-byte cache block in the 604e data cache assumes one of four states: the invalid state (I), the shared state (S), the exclusive state (E), and the modified state (M). In the modified state, the address block is valid in the cache, and only in this cache. The data in the block has been modified with respect to the memory and has not been written back to the memory. In the exclusive state, the address block exists in a single cache and memory. In the shared state, the address block exists in at least two caches and memory. In the shared and exclusive state, cache block data is always consistent with the system memory, because the copy in the cache is unmodified.

In order to enforce consistency rules in the 604e data cache, each 604e processor follows simple rules for managing the cache. These include externally broadcasting the intention to read a cache block which is not in the cache, and externally broadcasting the intention to write into a block which is not owned exclusively. Other processors respond to these broadcasts by snooping their caches and reporting status back to the originating processor. The status return includes a shared indicator, which indicates that another processor has a copy of the address block. It also includes a retry indicator, which indicates that another processor has either a modified copy of the address block that needs to be pushed out of the chip, or another processor has a queuing problem that prevented appropriate snooping from occurring.

In one embodiment of the present invention, the caches and memories within data flow manager 100 are sized appropriately to optimize system performance. In one example, shared memory 200 contains 32 megabytes of data, processor memory 220 contains 128 megabytes of memory, L2 cache 250 contains 512 K-bytes of memory, I-cache 262 contains 32-K bytes of memory, D-cache 264 contains 32-K bytes of memory, I-cache 272 contains 32-K bytes of memory and D-cache 274 contains 32-K bytes of memory.

The bandwidths along various data paths within data flow manager 100 are also scaled to optimize system performance. Processor bus 240 transfers 64 bits of data at 50 or greater MHz. The direct connection between shared memory controller 210 and shared memory 200 can transfer 32 bits of data at 50 MHz. Finally, I/O bus 110 transfers 32 bits of data between I/O cards 130, 132 and 134 and shared memory 200 at 25 MHz.

Shared memory 200 generally contains packets of data in transit between network interface devices. Each network interface device needs specific memory resources to store I/O buffers and control structures to support their network interface functions. For instance, control structures like receive and transmit buffer descriptor rings may be maintained in shared memory 200 to support specific devices. Other devices may maintain lists of buffer descriptors for use in the network interface functions. In addition to the rings and lists of control structures, the actual buffers that these devices load packets of I/O data into are provided in shared memory 200.

Processor memory 220 generally contains instructions and data used by processors 260 and 270. This includes software to provide bridging, routing and gateway functions to the network interfaces on I/O bus 110. Representative software, which may be supported by the system, includes the following:
1. mailbox driver;
2. ethernet driver;
3. T1 driver;
4. token ring driver;
5. FDDI driver;
6. other network interface drivers;
7. OSI route protocol;
8. OSI route function;
9. IP route function;
10. LLC/SNAP protocol;
11. user interface;
12. kernel file system;
13. 604e kernel;
14. protocol stacks (TCP, OSI);
15. IP route protocol;
16. link management;
17. MAC level routing; and
18. other MAC level drivers.

The software architecture provides bridging, routing and gateway functions. Packets will be received by the MAC level drivers, of which 2, 3, 4 and 5 are examples. This module consults the LLC/SNAP protocol to determine the protocol of the packet involved. This information along with the MAC level address table will determine the packet destination and the packet will be placed into the correct outgoing MAC mailbox. If the LLC/SNAP indicates a network level packet type, and this type is recognized as a routable protocol, and the router is configured to network level route that protocol, then the software will examine network level addressing in the packet in order to determine the packet destination. In either case, the packet may need to be modified before being queued at the outgoing mailbox. If the packet is destined for this box, it will be passed to the appropriate protocol layer. Otherwise, there is no need for the packet and it will be discarded.

Processors 260 and 270 only make limited accesses to the packet control fields and control structures in shared memory 200 necessary to support the software architecture. Almost all of the data and instructions necessary for these routines is maintained in processor memory 220 or in cache memories 250, 262, 264, 272 and 274.

Figure 3:
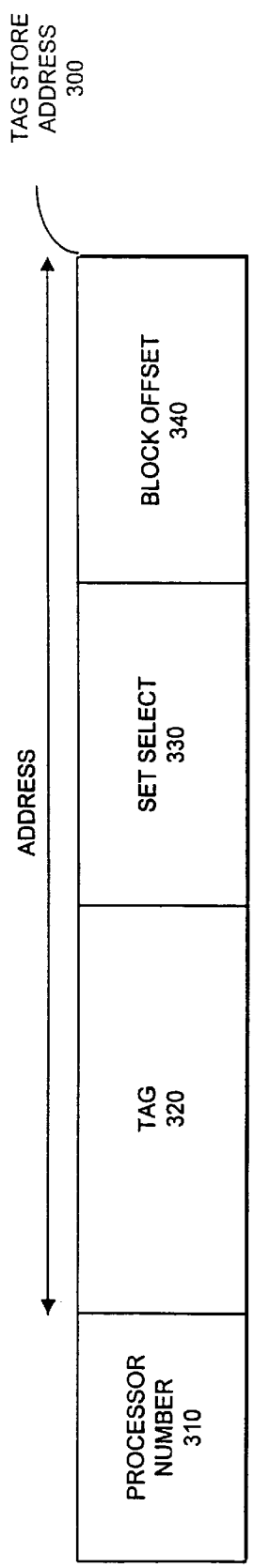
FIG. 3 is a diagram illustrating the components of a tag store address 300 for accessing the tag store 215 in accordance with an aspect of the present invention.
Figure 4:
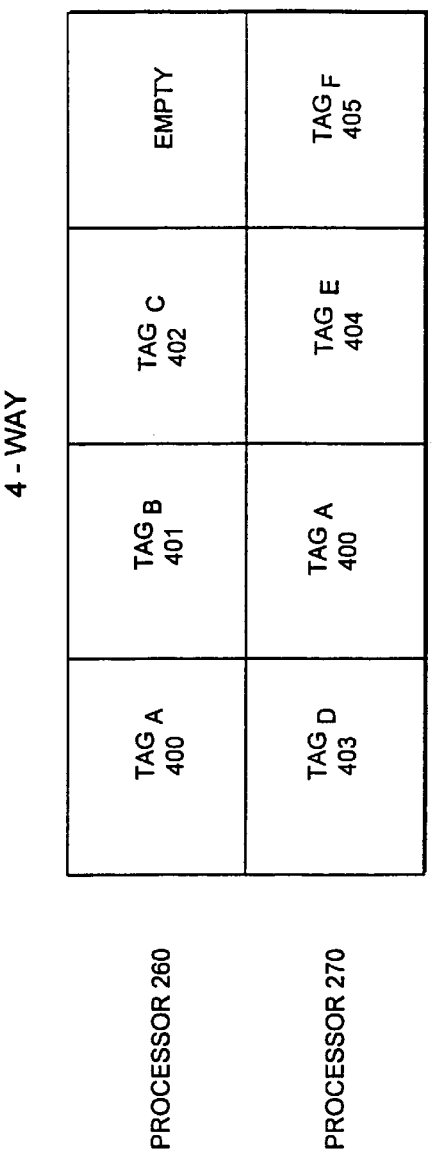
FIG. 4 is a diagram illustrating how a tag store 215 contains a number of entries for each processor in accordance with an aspect of the present invention.
Figure 5:
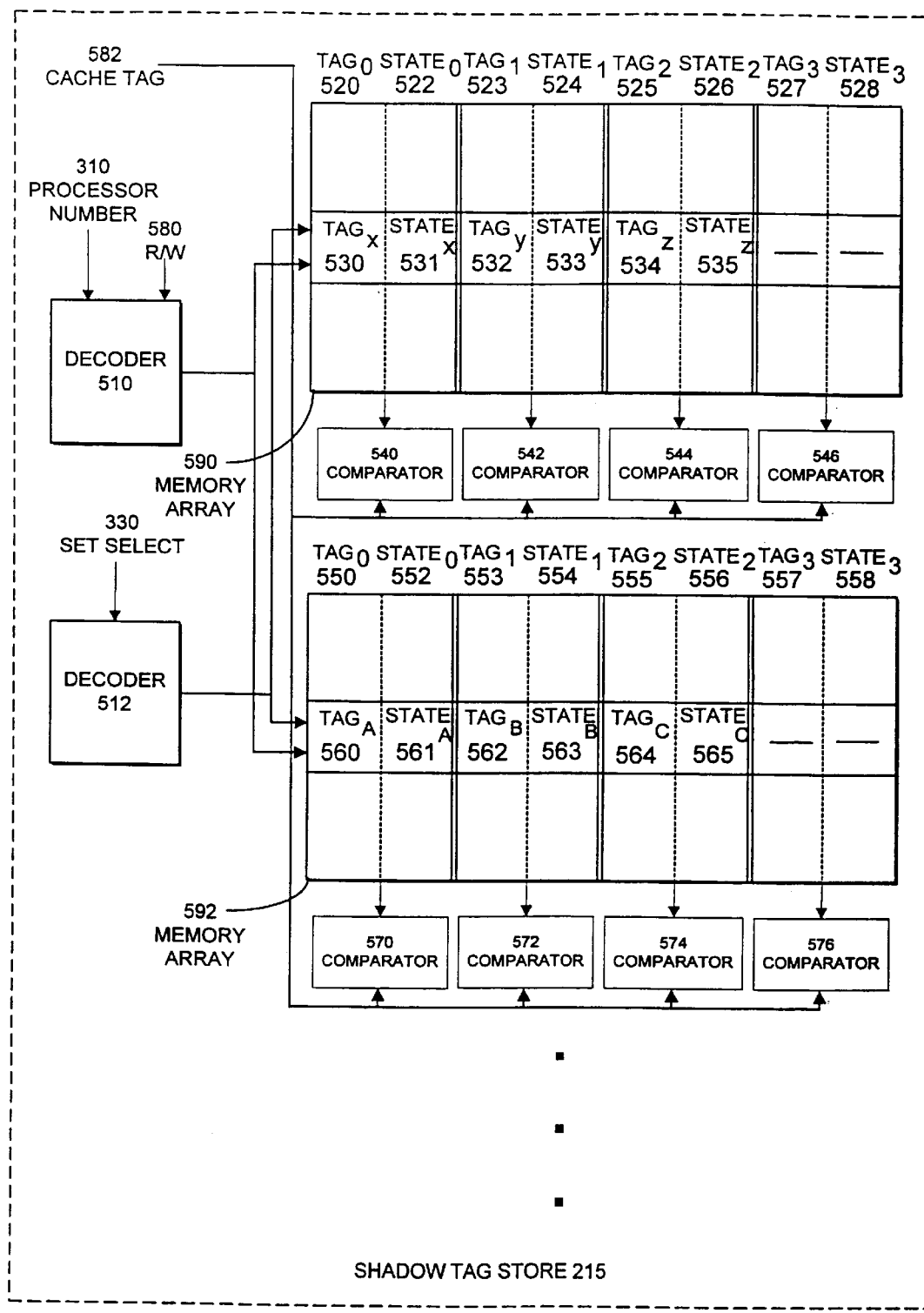
FIG. 5 is a diagram illustrating how items within the tag store 215 are indexed in accordance with an aspect of the present invention.

Details of the structure of shadow tag store 215 within shared memory controller 210 are illustrated in FIGS. 3, 4 and 5. Shadow tag store 215 maintains a record of data items from shared memory 200 which are copied into D-caches 264 and 274 or L2 cache 250. Shared memory controller 210 uses shadow tag store 215 to minimize traffic across processor bus 240 to enforce consistency rules between shared memory 200 and D-caches 264 and 274. When a read or write access to shared memory originates from I/O bus 110, shared memory controller 210 examines shadow tag store 215 to determine whether the read or write operation is directed at an item in shared memory 200 which has been copied into either D-cache 264 or D-cache 274. If a copy does exist within D-cache 264 or D-cache 274, a consistency transaction may be required across processor bus 240. If not, no consistency transaction takes place across processor bus 240. Thus, unnecessary consistency transactions are eliminated on processor bus 240, and overall system throughput is thereby improved.

FIG. 3 illustrates the components address 300, which includes a processor number and a processor memory address. Address 300 is an address within shared memory 200 connected to a processor number, and is used to index shadow tag store 215. Address 300 includes: processor number 310, tag 320, set select 330 and block offset 340. Processor number 310 identifies the processor in which the data item from shared memory 200 is stored. Block offset 340 occupies the lower order of bits of an address within shared memory 200, and is sized to accommodate a particular cache block size. For example, if a cache block is 32 bytes in size, block offset 340 will be $\log_2 32$, or 5 bits in size. Block offset 340 can be used as an index into an associated cache block. Set select 330 determines a particular set within one of the data caches.

Tag 320 includes the remaining bits of an address within shared memory 200. Tag 320 functions as an identifier which is stored within each of the data caches, and is indexed by set select 330. When a particular set is indexed with a desired address, a number of tags are read out of shadow tag store 215. These tags are compared with the tag of the desired address to determine if the address tag is resident within shadow tag store 215. If so, a corresponding cache block exists in one of D-caches 264 or 274.

FIG. 4 illustrates the entries within a particular set within shadow tag store 215. Shadow tag store 215, like data caches 264 and 274, is 4-way set-associative. Shadow tag store 215 contains much of the same data as stored in D-caches 264 and 274, except that it does not store the actual blocks of data associated with entries within D-caches 264 and 274. For each set indexed by set select 330, shadow tag store 215 contains four entries for D-cache 264 and four entries for D-cache 274. This is necessary because both D-caches 264 and 274 are 4-way set-associative. More specifically, for D-cache 264, shadow tag store 215 contains $tag_A$ 400, $tag_B$

401, tag$_C$ 402 and an empty location. For D-cache 274, shadow tag store 215 contains tag$_D$ 403, tag$_A$ 400, tag$_E$ 404 and tag$_F$ 405. Note that tag$_A$ 400 appears in entries for both D-cache 264 and D-cache 274. This indicates that the same block of data from shared memory 200 is stored in both D-cache 264 and D-cache 274. Also note that the empty entry for processor 260 indicates that the particular set within D-cache 264 only contains three entries of I/O data from shared memory 200.

FIG. 5 illustrates how entries within shadow tag store 215 are referenced. Processor number 310 from the shadow tag store address 300, and read/write signal R/W 580 feed into decoder 510, which connects to both memory array 590 and memory array 592. Set select 330 feeds into decoder 512, which also connects to memory array 590 and memory array 592. Note that one memory array is associated with each D-cache. Hence, if a system has N D-caches, the shadow tag store will contain N memory arrays.

During a check operation from shadow tag store 215, decoder 512 uses set select 330 to index an entry in memory array 590 and an entry in memory array 592. The entry in memory array 590 contains information for up to four cache blocks, corresponding to the four "ways" in 4-way set-associative D-cache 264. The entry in memory array 592 contains information for up to four cache blocks, corresponding to the four "ways" in 4-way set-associative D-cache 274. The entry from memory array 590 feeds into comparators 540, 542, 544 and 546, and the entry from memory array 592 feeds into comparators 570, 572, 574 and 576. These comparators compare tags in each entry with cache tag 582. For example, for memory array 590, decoder 512 indexes tagx 530 and statex 531. Tagx 530 is the tag portion of an address within shared memory 200 corresponding to a block from shared memory 200 which has been copied into a D-cache 264. Statex 531 indicates the state of the associated cache block within D-cache 264, including an indication of whether or not the cache block has been modified within D-cache 264. Decoder 512 additionally indexes tags 532 and states 533. These correspond to another cache block within D-cache 264. It also indexes tagz 534 and statez 535, which correspond to yet another cache block within D-cache 264. Finally, decoder 512 indexes an empty slot, which indicates that the corresponding entry in D-cache 264 does not contain a copy of block within shared memory 200.

A During an update operation to shadow tag store 215, processor number 310 and R/W signal 580 feed into decoder 510, which selects one of the memory arrays 590 and 592, depending upon which of D-caches 264 and 274 were updated. Set select 330 feeds into decoder 512, which indexes an entry from the selected memory array. The proper tag and index pair is then updated within the indexed entry.

Shared memory controller 210 from FIG. 2 is generally configurable to support a number of different configurations of processors, processor caches and L2 caches. It also supports a plurality of modes of operation. According to one embodiment of the present invention, shared memory controller 210 supports three different modes of operations.

In the first mode, shared memory controller 210 generates consistency transactions on processor bus 240 in response to all read and write accesses to shared memory 200 by I/O bus 110.

In the second mode, shared memory controller 210 examines shadow tag store 215 during read operations only. Shared memory controller 210 issues a cache flush command over processor bus 240 only if shadow tag store 215 indicates that either D-cache 264 or D-cache 274 contains a modified copy of the item of shared memory that is being read. During write operations, shared memory controller 210 issues an invalidation command across processor bus 240 to invalidate any cache entry containing the data item written to.

In the third mode, shared memory controller 210 examines shadow tag store 215 during both read and write operations from I/O bus 110 to shared memory 200. During a read operation, shared memory controller 210 issues a cache flush command over processor bus 240 only if shadow tag store 215 indicates that either D-cache 264 or D-cache 274 contains a modified copy of the item of shared memory that is being read. During write operations, shared memory controller 210 issues an invalidation command across processor bus 240 only if a data item is located in either D-cache 264 or D-cache 274. Otherwise, no consistency transactions take place across processor bus 240.

Figure 6:
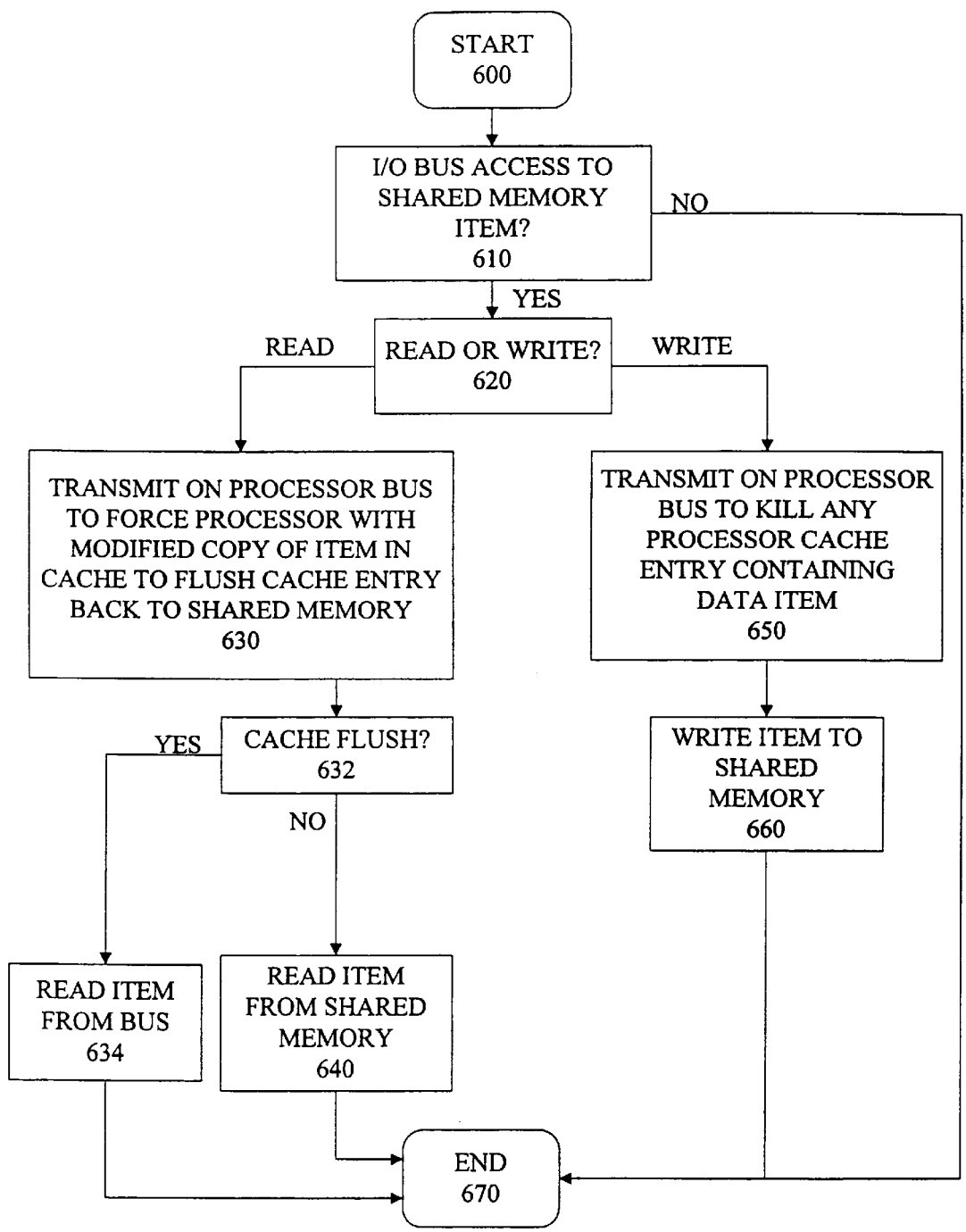
FIG. 6 is a flow chart of the sequence of operations which take place during an I/O bus access to the shared memory 200 in a first mode of operation in accordance with an aspect of the present invention.

FIG. 6 is a flow chart illustrating the operation of the consistency logic in the first mode of operation. The system starts at step 600. At step 610, the systems asks if there has been an I/O bus access to an item from shared memory 200. If not, the system loops back to step 610. If so, system advances to step 620. At step 620, the systems asks whether the I/O bus access to shared memory is a read or a write operation. If it is a read operation, the system proceeds to step 630. If it is a write operation, the system proceeds to step 650.

At step 630, a read operation is a taking place from I/O bus 110 to an item in shared memory 200. In this case, shared memory controller 210 transmits a command across processor bus 240 to force caches with modified copies of the item from shared memory 200 to flush their modified copies back to shared memory 200. The system then proceeds to step 632. At step 632, the system determines whether a cache flush will take place. If so, the system proceeds to step 634, in which the item is read directly from processor bus 240 during the cache flush before proceeding to end state 670. If not, the system proceeds to step 640. At step 640, the item is finally read by I/O bus 110 from shared memory 200. The system then advances to step 670, which is an end state.

At step 650, the I/O bus access is a write operation. Shared memory controller 210 transmits a message on the processor bus to invalidate any processor cache entry containing a copy of item of shared memory. The system then advances to step 660. At step 660, the item of shared memory is written to by I/O bus 110. The system then advances to step 670, which is an end state.

The flow chart in FIG. 6 shows the system beginning at start state 600 and advancing to end state 670. In one embodiment of the present invention, the system loops back from end state 670 to start state 600 to repeat the process with the next successive access to shared memory 200 from I/O bus 110.

Figure 7:
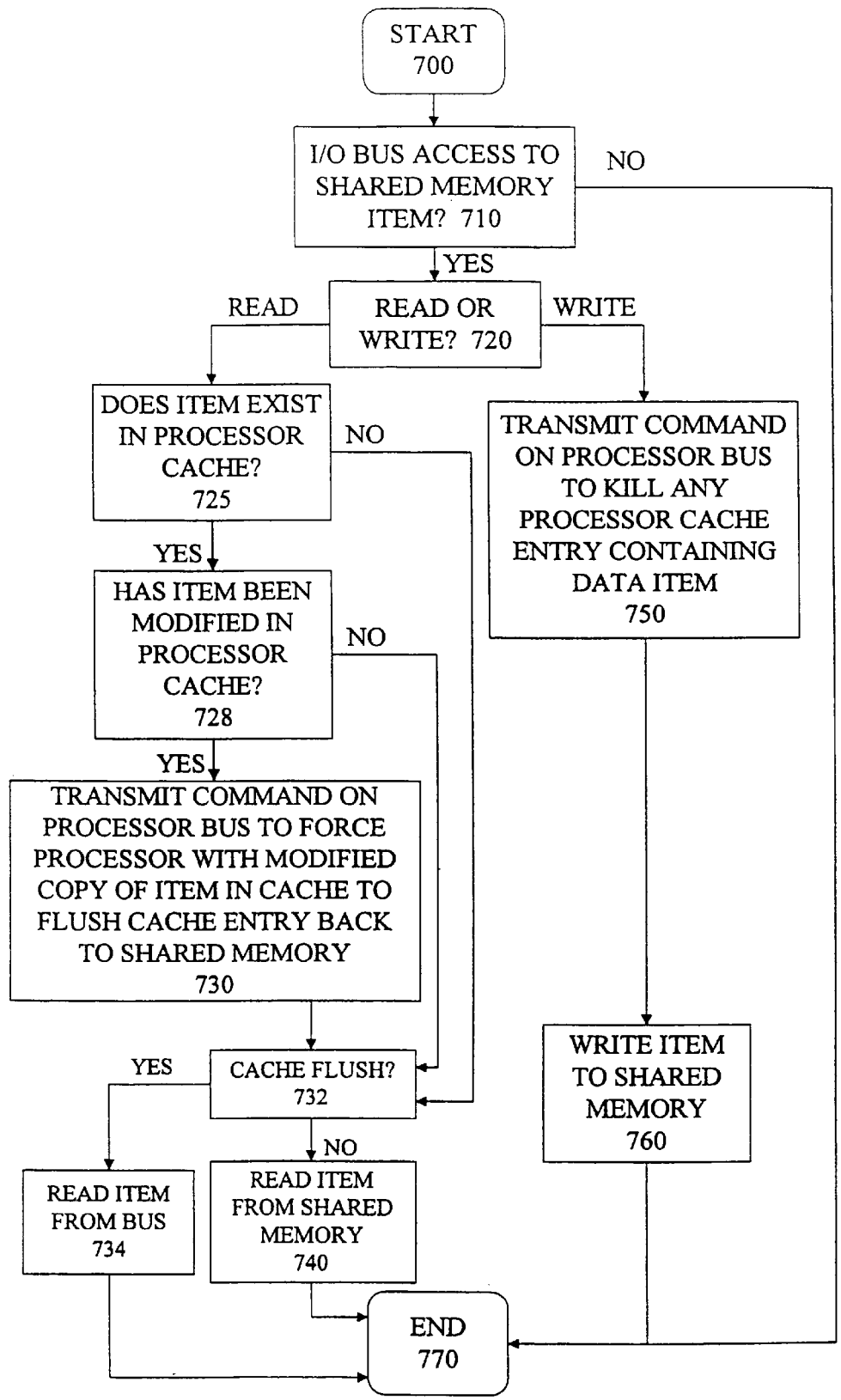
FIG. 7 is a flow chart of the sequence of operations which take place during an I/O bus access the shared memory 200 in a second mode of operation in accordance with an aspect of the present invention.

FIG. 7 is a flow chart illustrating the operation of the consistency logic in a second mode of operation. The flow chart in FIG. 7 is the same as the flow chart in FIG. 6, except that read operations additionally involve examining shadow tag store 215 before generating a consistency transaction over processor bus 240.

The system begins at step 700, which is a start state that automatically advances to step 710. At step 710, the system asks whether an I/O bus access to shared memory is taking place. If not, the system returns to step 710. If so, the system advances to step 720. At step 720, the system asks whether the access to shared memory 200 by the I/O bus 110 is a read or a write operation. If it is a read operation, the system advances to step 725. If it is a write operation, the system advances to step 750.

At step 725, the operation is a read operation. The system examines shadow tag store 215 to determine whether the item accessed from shared memory 200 exists in either D-cache 264 or D-cache 274. If not, the system proceeds to step 732. If so, the system proceeds to step 728. At step 728, the system examines shadow tag store 215 to determine whether an item has been modified in either D-cache 264 or D-cache 274. If not, the system proceeds to step 732. If so, the system proceeds to step 730.

At step 730, the system knows that the item of shared memory, which is to be read by the I/O bus 110 is copied into one of processor caches 264 or 274, and that it has been modified. Shared memory controller 210 then broadcasts a command on processor bus 240 to force the cache with the modified copy of the item to flush the modified copy back to shared memory 200. The system then proceeds to step 732. At step 732, the system determines whether a cache flush will take place. If so, the system proceeds to step 734, in which the item is read directly from processor bus 240 during the cache flush before proceeding to end state 770. If not, the system proceeds to step 740. At step 740, I/O bus 110 finally reads the item from shared memory 200. The system then advances to step 770, which is an end state.

At step 750, the I/O bus access to shared memory 200 is a write operation. As in the flow chart of the first mode of operation in FIG. 6, shared memory controller 210 transmits a message on processor bus 240 causing processors 260 and 270 to invalidate any cache entries containing the data item. The system next advances to step 760. At step 760, I/O bus 110 performs a write operation to the item in shared memory 200. Next, the system advances to step 770, which is an end state.

FIG. 7 illustrates a sequence of operations that begin with start state 700 and end at end state 770. In one embodiment of the present invention, end state 770 loops back to start state 700 to allow the next successive I/O bus access to shared memory 200 to be processed in the same way.

Figure 8:
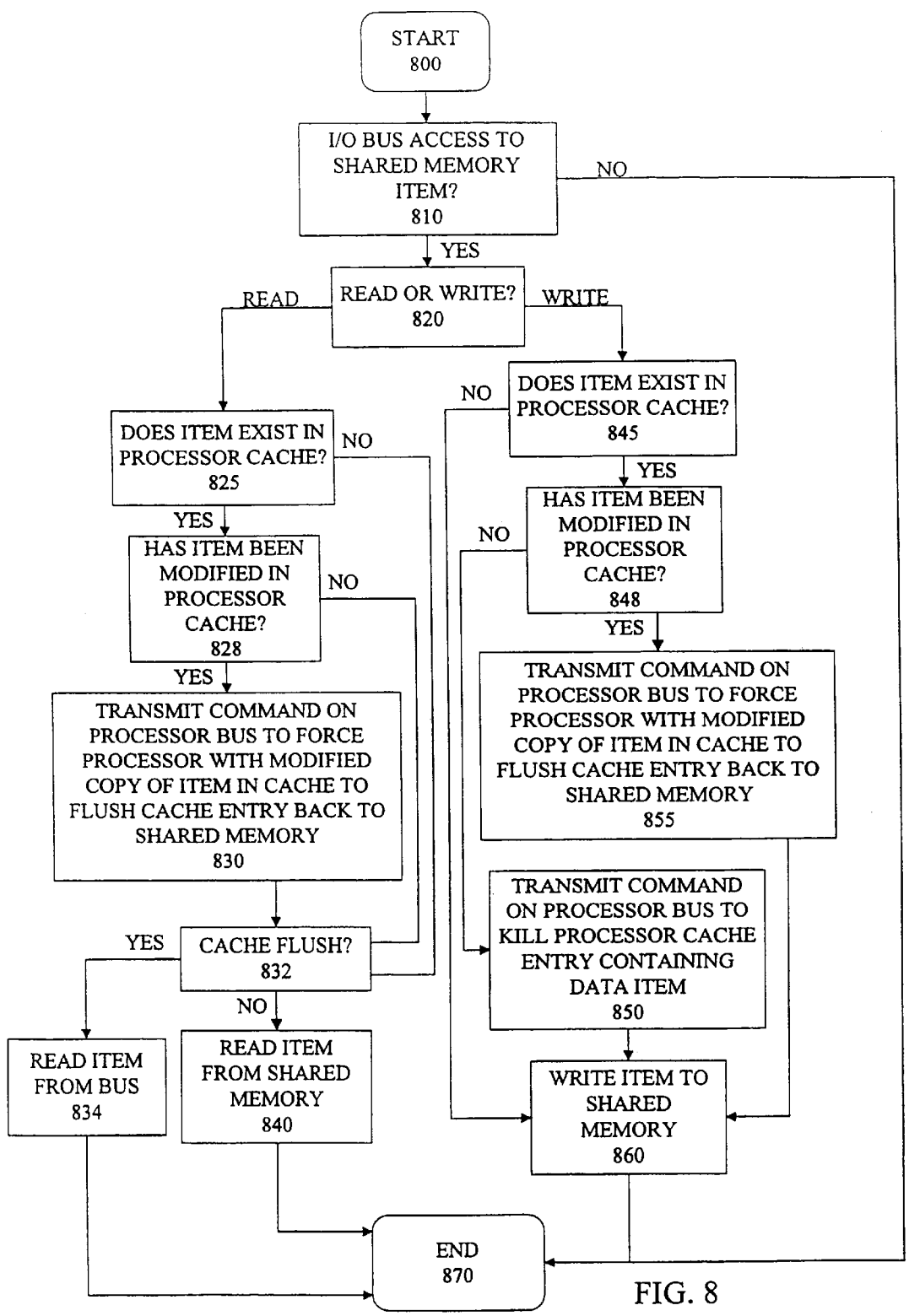
FIG. 8 is a flow chart of the sequence of operations which take place during an I/O bus access to shared memory 200 in a third mode of operation in accordance with an aspect of the present invention.

FIG. 8 is a flow chart illustrating the operation of the consistency logic in a third mode of operation. In this mode, shared memory controller 210 examines shadow tag store 215 during both read and write accesses to shared memory 200 by I/O bus 110.

The system begins at steps 800 which is a start state. The system next advances to step 810. At step 810, the system asks whether there has been an access to shared memory 200 through I/O bus 110. If not, the system loops back to step 810. If so, the system advances to step 820. At step 820, the system asks whether the I/O bus access to shared memory 200 is a read or a write operation. If it is a read operation, the system advances to step 825. If it is a write operation, the system advances to step 845. At step 825, the I/O bus access to shared memory 200 is a read operation. Shared memory controller 210 examines shadow tag store 215 to determine whether the item from shared memory 200 has been copied into either D-cache 264 or D-cache 274. If not, the system advances to step 832. If so, the system advances to step 828. At step 828, shared memory controller 210 examines shadow tag store 215 to determine whether the item of data has been modified in either D-cache 264 or D-cache 274. If not, the system advances to step 832. If so, the system advances to step 830. At step 830, shared memory controller 210 transmits a command on the processor bus 240 to force any caches with a modified copy of data item from shared memory 200 to flush the modified copy back to shared memory 200. The system then proceeds to step 832.

At step 832, the system determines whether a cache flush will take place. If so, the system proceeds to step 834, in which the item is read directly from processor bus 240 during the cache flush before proceeding to end state 870. If not, the system proceeds to step 840. At step 840, I/O bus 110 finally reads data item from shared memory 200. The system then advances to step 870, which is an end state.

At step 845, the I/O bus access to shared memory 200 is a write operation. Shared memory controller 210 examines shadow tag store 215 to determine whether the item of data from shared memory has been copied into D-cache 264 or D-cache 274. If not, the system advances to step 860. If so, the system advances to step 848. At step 848, shared memory controller 210 examines shadow tag store 215 to determine whether the item of data has been modified in either D-cache 264 or D-cache 274. If not, the system advances to step 850. If so, the system advances to step 855. At step 850, shared memory controller 210 transmits a command across processor bus 240 to invalidate any entry in D-cache 264 or D-cache 274 which contains the data item. The systems next advances to step 860. At step 855, shared memory controller 210 transmits a command on the processor bus 240 to force any caches with a modified copy of data item from shared memory 200 to flush the modified copy back to shared memory 200. The system next advances to step 860. At step 860, I/O bus 110 performs the write operation to the item of data in shared memory 200. The system then advances to step 870, which is an end state.

FIG. 8 illustrates a sequence of operations beginning at start state 800 and ending at end state 870. In one embodiment of the present invention, end state 870 loops back to start state 800 so that the system can processes the next I/O bus access in the same way.

One case that must be carefuilly considered is when the I/O device writes to a location that is marked Modified in a processor cache. This can be handled in a number of ways. In one embodiment, packet memory has boundaries that align with cache blocks. In this embodiment, an I/O device write to a location marked modified in a processor cache is handled the same way as a write to unmodified cache line, which invalidates the cache line in the processor as the flow diagrams specify. This works only because the embodiment enforces a specific memory alignment/allocation. This limitation means that both devices are modifying the same data block, which is an error. The result, is that if the processor writes into a buffer at the same time that the I/O device is writing to it, then the processor write may get lost. This is OK with the above restrictions since it is an error case.

In one embodiment, the I/O controller has knowledge of the cache line size and will issue the cache consistency commands based on this knowledge. More specifically, if the cache line is 16 bytes and the I/O operations are in four byte quantities, the I/O controller will not repeat a cache control command until it detects that the I/O operation has crossed a cache line boundary.

In another embodiment, portions of memory that contain control structures are marked as "write through". This means cache blocks are never marked Modified, and the processor and I/O device can successfully write to different parts of the same cache block without consistency problems.

Shadow Tag Store

The operation of the shadow tag store is best explained with simplified examples using the PowerPC 604 instruction set. For these examples, the L1 cache will be assumed to have two sets each with two blocks (i.e. 2-way associative) and one copyback buffer. Memory lines are added to the L1 cache through explicit load or store instructions or via cache directives such as cache block touch (dcbt/dcbtst) and cache block zero (dcbz). Memory lines are removed from the L1 cache when a cast-out is required because the set associativity is exceeded. Memory lines are also removed in response to external bus commands to support the MESI cache coherency protocol. This protocol is only required when a multi-processor system is implemented.

Two variations of the shadow tag store are presented below: a uni-processor system, and a multi-processor system with cache tags and state. Since the internal operation of the processor cannot be observed, all the cache activity is defined by the external bus actions generated by the internal instructions and bus interface logic. The PPC604 uses the 5 bit Transaction Type (TT) identifier, the 3 bit Transaction Code (TC) identifier to indicate the reason for a bus transaction and how the L1 cache is affected by it, and the write-through (WT) identifier. Specifically, the TC has a bit that indicates that an entry has been removed from the L1 cache, a bit that indicates that the associated entry is now shared, and a bit that indicates that the transaction caused a copyback buffer to be used. Copyback (CB) buffers can be thought of as extensions of the cache. When a modified entry in the cache is removed from the cache it must be written back to main memory. Since this copyback operation is not timing-critical it is queued in a CB buffer while the more critical load operation completes. However, the completion of the copyback is critical to the proper sequentiality of the main memory accesses, so an external DMA process must wait for the copyback to complete before read or write accessing the associated main memory locations. The number of CB buffers varies with the processor implementation. The 604 processor has either one or two CB buffers. The 604e has three CB buffers. See, generally, "PowerPC 604 RISC Microprocessor User's Manual MPC604UM/AD11/94," and "Addendum to PowerPC Risc Microprocessor User's Manual: PowerPC 604e Microprocessor Supplement and User's Manual Errata."

In the examples which follow, the signals on the processor bus are expressed in this format:

Op Tag/CSE/TC, where Op is a phrase or mnemonic describing the transaction type; Tag is a unique id associated with the memory line; CSE is either a, b or x indicating the block in the set; TC is a code with D, S and C to indicate cache status, D meaning deallocation occurred, S meaning new cache state is shared, C meaning a copyback buffer was used, and N meaning none of the above.

For example, a read that causes a castout might be coded "Read/00/a/C," and a cache copyback can be coded "Write-with-kill/01/b/D."

Uniprocessor Operation

In a uni-processor system, the L1 cache entries are never shared because there is only one processor. Entries are added to the L1 cache when there is a read (load or store) miss, or via certain explicit cache control instructions. Entries are only removed from the cache to make room for newer entries when the capacity is exceeded, when external DMA writes to a location contained in the cache, or when certain explicit cache control instruction is executed. A load instruction causes a Read transaction on the processor bus. If there is an empty location in the cache or if the entry being replaced is unmodified (i.e. can be simply overwritten), the TC will indicate that no CB buffer was used. If the entry is in the modified state, the entry is moved to a CB buffer for later writing to main memory and the new line is loaded into the cache entry. The shadow tag store determines the cache entry that was loaded from the set selection portion of the read transaction address and from the cache set entry (CSE) signals. The modified line will later appear on the processor bus as a Write-with-kill transaction with the deallocate bit set.

From a bus transaction view the primary way that an entry is added to the L1 cache is via the Read or Read-with-intent-to-modify (RWITM) transactions. A Read transaction results in a "clean" tag store entry (E or S state) and the RWITM transaction results in a "dirty" (M state) entry. In either case, there is a possibility that the displaced L1 entry was modified and was placed in a copyback buffer for writing to main memory. The other way to add an entry to the L1 cache is by executing the Data Block Zero (dcbz) instruction. This is a cache directive to store zeros in all the bytes of the cache line. Since it is totally destructive of the main memory data no read operation is required. Instead a Kill-block transaction is issued on the bus to remove the cache line from any other cache. This transaction can be detected as adding an entry to the L1 cache because the tag and set will not match any entry in the shadow tag store. As with the read cases, the new entry could displace a modified entry and will require that the entry be moved to a CB buffer for writing to main memory. There is a special cache directive (dcbi) for destructively removing an entry from the L1 cache. It should only occur when the cache is being initialized. The normal method to remove a cache entry is the Write-with-kill transaction. These occur as a result of the completion of a cache copyback, the execution of the cache invalidate (dcbf) instruction, or observing (aka snooping) a Flush or RWITM transaction on the processor bus. There is also the case of snooping a Read or Clean transaction on the processor bus that 'hits' an entry that is "dirty." In this case, the Write-with-kill transaction is used to write the modified L1 entry back to main memory, but to retain the entry in the L1 cache as a "clean" entry.

For the PPC 604 used in a uniprocessor configuration, there are 9 bus transactions that indicate a change in the tag store of the L1 cache. Six of the transactions indicate that a new entry has been added. In three of those six cases the entry that was replaced had been modified and must be written back to main memory via the copyback buffer. The other three transactions indicate that an entry has been removed from the L1 cache. Since the processor operates in a uniprocessor mode the L1 cache entries can only be in one of the unshared states {MEI}. This allows an entry to 'silently' transition from the E state to the M state. Therefore an external DMA controller must assume that all entries can be in the M state. This means issuing a Clean block transaction for any address tag match of a DMA read, and issuing a Flush block transaction for any tag match on a DMA write. The processor will determine if it actually needs to perform further bus operations to support main memory coherency. Uniprocessor bus operations appear in Table 1.

TABLE 1

| BusOp  | -WT | TC | L1Action     |
|--------|-----|----|--------------|
| WrKill | 1   | D  | CB complete  |
| WrKill | 0   | D  | Remove       |
| Kill   | x   | D  | Remove       |
| Kill   | 1   | N  | Add          |
| Kill   | 1   | C  | Add, CB Used |
| Read   | 1   | N  | Add          |
| Read   | 1   | C  | Add, CB Used |
| RWITM  | 1   | N  | Add          |
| RWITM  | 1   | C  | Add, CB Used |

FIG. 9 provides an example trace of cache state changes, bus transactions, and describes the reason for the state changes for uniprocessor operation. In this mode, the shadow tag store only tracks the validity and value of the address tags of the entries in the L1 cache. The trace in FIG. 9 shows the interaction of several processor and DMA operations and demonstrates the utility of the invention that is being claimed. There are 15 columns in the trace, in left to right order: a sequence number (for reference); four columns that show the state of the four cache entries; the copyback buffer state; the processor operation; the DMA operation; the bus transaction; the state (Tag, CSE and TC) signals associated with the bus op; the bus master (P=proc/D=DMA); the ARTRY (retry) bus state; the SHD (shared) bus state; the memory bus operation; and a brief comment about the BusOp transaction.

The first four Ops show the addition of four new entries to the processor L1 cache, one of which is modified. Op 5 is an internal operator that does not cause an external bus transaction because the affected memory line was already contained in the L1 cache. Op 6 is a Store instruction that causes a modified line to be replaced. That line is moved to the copyback (CB) buffer. Op 7 shows the CB buffer flush to the processor bus. Op 8 is a DMA Read that hits the set Ob in the cache. Since this entry is clean (e), the read proceeds on the memory bus. Op 9 is a load that causes a replacement of clean cache entry. Op 10 is a DMA Read that does not hit a cache entry so the read is issued directly to the memory bus and there is no processor bus action. Op 11 is a load that causes a replacement of a clean cache entry. Op 12 is a DMA write that hits an entry in the L1. The DMA controller issues a Flush to the processor bus to force the processor to write any modified data back to memory. In this case, the cache entry was clean, so the processor does not force a bus retry; it simply removes the cache entry which is being changed by the DMA write. Op 13 is a DMA read that hits an L1 cache entry. In this case, the entry is modified so when the DMA controller issues the Clean transaction the processor asserts the ARTRY signal to force the DMA controller to retry the Clean transaction. The processor then schedules a Write-with-kill transaction that writes the modified data back to memory and changes the cache state to E. The bus protocol permits this operation to have high priority so it will occur before the DMA controller can retry the Clean. Op 15 shows the DMA controller retrying the Clean successfully which allows it to issue the write to memory. Op 16 is a DMA write that does not hit an L1 cache entry so the DMA controller simply issues it on the memory bus. Op 17 is a store instruction that adds a cache line to a previously empty entry. Op 18 is another store that replaces a clean entry in the cache. Op 19 is a load that replaces a dirty entry in the cache causing it to be written to the CB buffer. Op 20 is a DMA write that hits the entry that is in the CB buffer. The DMA controller issues a Flush transaction which the processor ARTRYs because of the hit in the CB buffer. Op 21 shows the processor completing the copyback with a memory write. Op 22 shows the now successful Flush transaction which allows the DMA controller to issue the write to main memory.

Multiprocessor Operation

If there are multiple 604 processors, or the tag shadow controller operates in multiprocessor mode, there is sufficient data in the bus transactions to determine if the L1 cache entry is "clean." In the multiprocessor case, there are 11 bus transactions that modify the state of the shadow tag store. As in the uniprocessor mode, there are six transactions that add an entry to the tag store, with three of them removing an existing modified entry. However one of the six is actually conditional and may only signal a "clean" entry becoming "dirty." This case is detected by the match of the bus tag and set select to an existing shadow tag store tag and set. There are three cases where entries are removed from the tag store, also like the uniprocessor mode. There are two additional transactions that do not change the entries, but do change the state of an entry from "dirty" to "clean." The operation on DMA writes is the same as the uniprocessor mode; the DMA controller issues a Flush transaction for any operation that 'hits' the shadow tag. If the L1 cache entry is known to be "clean" the bus operation can occur simultaneous to the write of data to memory since there will be no additional write operation from the processors. If the shadow tag store indicates that the entry is "dirty" the DMA controller must wait for the processor write to complete before the DMA write to memory can complete. The added state information allows the external DMA controller to decide on a DMA read whether the current L1 entry is "dirty" and needs to be written to main memory by issuing a Clean transaction. If the entry is "clean" the DMA controller does not need to issue any bus transaction. These improvements could be important in a multiprocessor system where there is a higher bus utilization. Multiprocessor bus operations appear in Table 2.

TABLE 2

| BusOp  | -WT | TC | L1Action           |
|--------|-----|----|--------------------|
| WrKill | 1   | D  | CE complete        |
| WrKill | 0   | D  | Remove             |
| WrKill | 0   | N  | Dirty->Clean       |
| WrKill | 0   | S  | Dirty->Clean       |
| Kill   | x   | D  | Remove             |
| Kill   | 1   | N  | Add or Clean->Dirty|
| Kill   | 1   | C  | Add, CB used       |
| Read   | 1   | N  | Add                |
| Read   | 1   | C  | Add, CB Used       |
| RWITM  | 1   | N  | Add                |
| RWITM  | 1   | C  | Add, CB Used       |

FIG. 10 provides an example trace of cache state changes, bus transactions, and describes the reason for the state changes for multiprocessor operation. The term multiprocessor refers to the fact that the shared flag causes the processor(s) to indicate when they modify a cache entry as is required for multiprocessor system operation. In this mode the shadow tag store tracks the validity and value of the address tags of the entries in the LI cache as well as an indicator of the modification status of the entry. The trace in FIG. 10 shows the interaction of several processor and DMA operations and demonstrates the utility of this facet of the invention that is being claimed. There are 15 columns in the trace, in left to right order: a sequence number (for reference); four columns that show the state of the four cache entries; the copyback buffer state; the processor operation; the DMA operation; the bus transaction; the state (Tag, CSE and TC) signals associated with the bus op; the bus master (P=proc/D=DMA); the ARTRY (retry) bus state; the SHD (shared) bus state; the memory bus operation; and a brief comment about the BusOp transaction.

The first three Ops show the addition of three new entries to the processor L1 cache using the SHD signal to force the shared (S) state. Op 4 shows a store that adds a new cache entry with the M state. Op 5 is a kill transaction to allow the processor to gain exclusive access to the cache entry in order to modify it. The shadow tag store recognizes that the entry is now in either the E or M states (i.e. "dirty"). Op 6 is a Store instruction that causes a modified line to be replaced. That line is moved to the copyback (CB) buffer. Op 7 shows the CB buffer flush to the processor bus. Op 8 is a DMA Read to a known clean entry in the cache so the read occurs immediately on the memory bus with no processor bus transaction. Op 9 is a load that causes a replacement of a clean cache entry. Op 10 is a DMA Read that does not hit a cache entry so the read is issued directly to the memory bus and there is no processor bus action. Op 11 is a load that causes a replacement of a clean cache entry. Op 12 is a DMA write that hits a known clean entry in the L1. The DMA controller simultaneously writes to memory and issues a Flush to the processor bus to remove the cache entry which is being changed by the DMA write. Op 13 is a DMA read that hits a known dirty L1 cache entry so the DMA controller issues a Flush transaction to which the processor asserts the ARTRY signal to force the DMA controller to retry the Flush transaction. The processor then schedules a Write-with-kill transaction that writes the modified data back to memory and removes the entry from the cache. In the multiprocessor mode, it is necessary to use a Flush on DMA Read operations rather than the Clean that is used in the uniprocessor mode because the E to M state change cannot be detected on the external bus. Alternatively the DMA controller could assume a 'sticky' M state for any entry that was Cleaned from the external bus. This condition would persist until the entry was removed from the cache. The trade-off is simply higher bus usage in order to get a higher cache hit rate. The bus protocol permits this operation to have high priority so it will occur before the DMA controller can retry the Clean. Op. 15 shows the DMA controller retrying the Clean successfully which allows it to issue the write to memory. Op. 16 is a DMA write that does not hit an L1 cache entry so the DMA controller simply issues it on the memory bus. Op. 17 is a store instruction that adds a cache line to a previously empty entry. Op. 18 is another store that replaces a clean entry in the cache. Op. 19 is a load that replaces a dirty entry in the cache causing it to be written to the CB buffer. Op 20 is a DMA write that hits the entry that is in the CB buffer. The DMA controller issues a Flush transaction which the processor ARTRYs because of the hit in the CB buffer. Op 21 shows the processor completing the copyback with a memory write. Op 22 shows the now successful Flush transaction which allows the DMA controller to issue the write to main memory.

CONCLUSION

The present invention provides an N-way internetworking device which performs bridging, routing and gateway services, and improves on the performance of previous generation internetworking products. The system is based on the concept of a shared memory, which is optimized for transfers of I/O data from network interface devices. The shared memory connects to a separate processor bus and a separate I/O bus. Thus, the processor can perform the routing functions without interference from the I/O processes of the network interface devices on the I/O bus. The processor only references the shared memory occasionally for such control information as is necessary to perform its services.

Conversely I/O transfers across the I/O bus do not interfere with the processor's performance. I/O operations do not "take over" a processor bus and stall it, while the I/O device transfers data.

The present invention increases performance over previous generations of internetworking devices by using fast microprocessors, and allowing items from the shared memory to be copied into processor-controlled caches in or near these fast microprocessors. The system enforces a set of consistency rules between items in shared memory, and copies of these items in the processor-controlled caches.

The system additionally minimizes transactions on the processor bus to enforce consistency rules by maintaining a shadow tag store 215 near the shared memory. The shadow tag store 215 contains a record of the items of data from the shared memory that are copied into processor caches. Commands to enforce consistency rules are generally broadcast on the processor bus only if the data items exist in a processor cache. Otherwise, no commands are transmitted across the processor bus. In this way, commands to enforce consistency rules are minimized, and processor system performances is thereby improved.

Additionally, the reduction in processor bus consistency traffic directly increases I/O bus throughput, because the I/O bus need not wait for as many consistency operations to complete. This translates to fewer I/O bus wait cycles, and higher average I/O bus throughput.

The foregoing description of embodiment of the invention has been presented for purposes of illustration and description only. It is not intended to be exhaustive or to limit the invention to the forms disclosed. Obviously, many modifications and variations will be apparent to practitioners skill in the art.

What is claimed is:

1. An apparatus for managing data flow among a plurality of I/O devices, comprising:

a first memory, for storing I/O data in transit between the plurality of I/O devices;

a first processor, including a first store for storing copies of items of I/O data from the first memory;

a first communication channel coupled to the first processor;

a second communication channel coupled to the plurality of I/O devices;

an access controller coupled to the first communication channel, the second communication channel and the first memory, which arbitrates accesses to the first memory by the first communication channel and the second communication channel;

an identification store coupled with the access controller, which stores identifying information about copies of items of I/O data from the first memory which reside in the first store; and consistency logic executing a set of consistency rules coupled with the access controller and the identification store, for maintaining consistency between the I/O data in the first memory and copies of the I/O data in first store, wherein the consistency logic uses the identification store to determine whether it is necessary to send a communication to the first processor across the first communication channel to enforce the set of consistency rules in response to read and write operations to the first memory.

2. The apparatus of claim 1, further including:

a plurality of processors; and a plurality of communication channels coupled to the plurality of processors and the access controller.

3. The apparatus of claim 1, wherein the second communication channel includes a plurality of communication channels coupled to the plurality of I/O devices.

4. The apparatus of claim 1, wherein the first communication channel includes a plurality of communication channels.

5. The apparatus of claim 1, wherein the first memory includes a plurality of memory banks.

6. The apparatus of claim 1, wherein the first memory includes a plurality of memories coupled to a plurality of separate memory busses.

7. The apparatus of claim 1, including a plurality of access controllers coupled to the first memory, the first communication channel and the second communication channel.

8. The apparatus of claim 1, including a plurality of access controllers coupled to a plurality of memories in the first memory.

9. The apparatus of claim 1, wherein the first communication channel is a bus.

10. The apparatus of claim 1, wherein the first communication channel is a cross bar switch.

11. The apparatus of claim 1, wherein the information store includes:
   data indicating which items of I/O data have been copied to the first store from the first memory; and
   data indicating whether copies of items of I/O data have been modified in the first store and not in the first memory.

12. The apparatus of claim 1, wherein the consistency logic responds to a write operation on the secondary communication channel to a memory item in the first memory by generating a communication on the first communication channel to invalidate a copy of the item in the first store when the information store indicates that the first store includes the copy of the item.

13. The apparatus of claim 1, wherein the consistency logic responds to a read operation on the secondary communication channel of an item of I/O data in the first memory by generating a communication on the first communication channel to cause a flush of a copy of the item from the first store to the first memory when the information store indicates that the first store includes the copy of the item, and that the copy of the item has been modified in the first store.

14. The apparatus of claim 1, wherein the consistency logic responds to a write operation on the secondary communication channel of an item of I/O data in the first memory by generating a communication on the first communication channel to cause a flush of a copy of the item from the first store to the first memory when the information store indicates that the first store includes the copy of the item, and that the copy of the item has been modified in the first store.

15. The apparatus of claim 1, wherein during a write operation by the first processor to a copy of an item of I/O data in the first store, the first store and the first processor generate a communication across the first communication channel, which causes the consistency logic to update a corresponding entry in the information store to indicate the copy of the item of I/O data has been modified in the first store.

16. The apparatus of claim 1, wherein during a read operation by the first processor of an item of I/O in the first memory which causes the item of I/O data to be copied to the first store, the consistency logic loads a corresponding entry into the information store to indicate the copy of the item of I/O data has been loaded in the first store and is valid.

17. The apparatus of claim 1, wherein the I/O data in transit between the plurality of I/O devices includes network data packets including header portions with communication protocol information.

18. The apparatus of claim 1, wherein:
   communications across the second communication channel include I/O data in the form of network packets including header portions with communication protocol information; and
   communications across the first communication channel include the header portions of the network packets in addition to control information and instructions used by the first processor.

19. The apparatus of claim 1, including a second processor which includes a second store for storing copies of the I/O data from the first memory, wherein:
   the first communication channel is coupled to the second processor;
   the information store stores tags containing identifying information about I/O data from the first memory which is copied into the second store; and
   the consistency logic enforces consistency rules between I/O data in the first memory and copies of the I/O data in the second store.

20. The apparatus of claim 1, including a plurality of processors, each including an associated store for storing copies of the I/O data from the first memory, wherein:
   the first communication channel is coupled to the plurality of processors;
   the information store stores tags containing identifying information about items of I/O data from the first memory which are copied into the associated stores of the plurality of processors; and
   the consistency logic enforces consistency rules between the I/O data in the first memory and copies of the I/O data in the associated stores of the plurality of processors.

21. The apparatus of claim 1, wherein the first store includes a cache memory.

22. The apparatus of claim 1, wherein the first processor is a microprocessor on a semi-conductor chip, and the first store is a cache on the semi-conductor chip.

23. The apparatus of claim 1, wherein the first processor is a semi-conductor chip and the first store is another semi-conductor chip, both of which are assembled into a packaged device.

24. The apparatus of claim 1, wherein the first processor includes an instruction cache.

25. The apparatus of claim 1, further including a second memory coupled to the first communication channel which stores control information and instructions used by the first processor to manage data flow between the plurality of I/O devices.

26. The apparatus of claim 1, further including a cache coupled to the first communication channel which stores instructions and data accessed by the first processor.

27. The apparatus of claim 1, wherein the access controller and consistency logic receive information about I/O data in the first store through the first communication channel, and use this information to maintain inside the information store identifying data about the items of I/O data in the first store.

28. The apparatus of claim 1, wherein the consistency logic maintains consistency between the I/O data inside the first memory, and copies of the I/O data in the first store of the first processor through communications with the first processor across the first communication channel.

29. The apparatus of claim 1, wherein the consistency logic uses the information in the information store to minimize the communications across the first communication channel to enforce the set of consistency rules between the I/O data in the first memory and copies of the I/O data in the first store of the first processor.

30. The apparatus of claim 1, wherein:
   the first processor is a semi-conductor chip;
   the first store is another semi-conductor chip; and
   including a cache bus coupled to the first processor and the first store.

31. The apparatus of claim 1, further including a level two cache coupled to the first processor through a dedicated bus, the level two cache storing instructions and data used by the first processor.

32. An apparatus for managing data flow among a plurality of I/O devices, comprising:

a shared memory, for storing I/O data in transit between the plurality of I/O devices;

a first processor, including a first cache for storing copies of the I/O data from the shared memory;

an I/O bus coupled to the plurality of I/O devices, wherein communications across the I/O bus include I/O data in the form of network packets including header portions with communication protocol information;

a processor bus coupled to the first processor, wherein communications across the processor bus include the header portions of the network packets and control information and instructions used by the first processor;

a processor memory coupled to the processor bus for storing control information and instructions used by the first processor to manage data flow between the plurality of I/O devices;

an access controller coupled to the processor bus, the I/O bus and the shared memory, for arbitrating accesses to the shared memory by the processor bus and the I/O bus;

an information store coupled with the access controller, containing identifying information about copies of I/O data from the shared memory in the first cache; and consistency logic executing a set of consistency rules coupled with the access controller and the information store, for maintaining consistency between the I/O data in the shared memory and copies of the I/O data in first cache; wherein the consistency logic uses the information store to determine whether to send a communication across the processor bus to the first processor to enforce the set of consistency rules in response to read and write operations to the shared memory.

33. The apparatus of claim 32, including a plurality of I/O busses coupled to the plurality of I/O devices.

34. The apparatus of claim 32, wherein the information store includes:

data indicating which items of I/O data which have been copied to the first cache from the shared memory; and data indicating whether the items of I/O data have been modified in the first cache and not in the shared memory.

35. The apparatus of claim 32, wherein a write operation on the I/O bus to a memory item in the shared memory generates a communication on the processor bus to invalidate a copy of the item in the first cache when the information store indicates that the first cache includes the copy of the item.

36. The apparatus of claim 32, wherein a read operation from an I/O device to an item of I/O data in the shared memory generates a communication on the processor bus to flush a copy of the item from the first cache to the shared memory when the information store indicates that the first cache includes the copy of the item, and that the copy of the item has been modified in the first cache.

37. The apparatus of claim 32, wherein a write operation by the first processor to a copy of an item of I/O data in the first cache generates a communication across the processor bus, which causes the consistency logic to update a corresponding entry in the information store to indicate the copy of the item of I/O data has been modified in the first cache.

38. The apparatus of claim 32, wherein during a read operation by the first processor of an item of I/O in the shared memory which causes the item of I/O data to be copied to the first cache, the consistency logic loads a corresponding entry into the information store to indicate the copy of the item of I/O data has been loaded in the first cache and is valid.

39. The apparatus of claim 32, further including a second processor coupled to the processor bus, including a second cache.

40. The apparatus of claim 32, further including a second processor, including a second cache for storing copies of the I/O data from the shared memory, wherein:

the second processor is coupled to the processor bus;

the information store stores tags containing identifying information about copies of I/O data from the shared memory in the second cache;

the consistency logic uses the information store to determine whether to send communications across the processor bus to the second processor to enforce the set of consistency rules in response to read and write operations to the shared memory.

41. The apparatus of claim 32, wherein:

the first processor is a microprocessor on a semiconductor chip, and the first cache is on the semiconductor chip.

42. The apparatus of claim 32, wherein the first processor is a semi-conductor chip and the first cache is another semi-conductor chip, both of which are assembled into a packaged device.

43. The apparatus of claim 32, wherein:

the first processor is a semi-conductor chip;

the first cache is another semi-conductor chip; and including a cache bus coupled to the first processor and the first cache.

44. The apparatus of claim 32, wherein the first processor includes an instruction cache.

45. The apparatus of claim 32, further including a level two cache coupled to the processor bus which stores instructions and data used by the first processor.

46. The apparatus of claim 32, further including a level two cache coupled to the first processor through a dedicated bus, the level two cache storing instructions and data used by the first processor.

47. The apparatus of claim 32, wherein the access controller and consistency logic receive information about I/O data in the first cache through the processor bus, and use this information to maintain inside the information store tags of identifying data about the I/O data in the first cache.

48. The apparatus of claim 32, wherein the consistency logic maintains consistency between the I/O data inside the shared memory, and copies of this I/O data in the first cache through communications with the first processor across the processor bus.

49. The apparatus of claim 32, wherein the consistency logic uses the information in the information store to minimize communications across the first communication channel to enforce the set of consistency rules between the I/O data in the first memory and copies of the I/O data in the first cache.

50. An apparatus for processing data packets in transit in a network, comprising:

a plurality of ports to transmit and receive data packets on respective communication media;

a communication channel coupled to the plurality of ports;

a shared memory which stores data packets;

a processor which processes routing information in data packets stored in the shared memory, including a processor store which holds copies of portions of data packets stored in the shared memory;

a memory interface, coupled to the shared memory, the communication channel and the processor, which provides access to the memory by the processor and the communication channel, the memory interface including resources which manage consistency of data packets stored in the shared memory and portions of data packets held in the processor store.

51. The apparatus of claim 50, wherein data packets include cell data defined by Asynchronous Transfer Mode protocol.

52. The apparatus of claim 50, wherein the processor includes an integrated circuit processing unit and a processor bus coupled to processing unit and to the memory interface.

53. The apparatus of claim 52, wherein the processor store comprises a cache on the integrated circuit processing unit.

54. The apparatus of claim 52, wherein the processor store comprises a cache within a package containing the integrated circuit processing unit.

55. The apparatus of claim 52, wherein the processor store comprises a memory coupled to the processor bus.

56. The apparatus of claim 52, wherein the processor store comprises a cache on the integrated circuit processing unit, and a memory coupled to the processor bus.

57. The apparatus of claim 52, wherein the memory interface includes an information store which stores identifying data for the portions of the packets of data held in the processor store.

58. The apparatus of claim 57, wherein the identifying data includes data indicating addresses in shared memory of portions of data packets copies of which are held in the processor store.

59. The apparatus of claim 58, wherein the identifying data includes data indicating whether the copies of portions of data packets held in the processor store are modified.

60. The apparatus of claim 57, wherein the resources which manage consistency respond to a write operation on the communication channel to a memory item in the shared memory by generating a communication on the processor bus to invalidate a copy of the item in the processor store when the information store indicates that the processor store includes the copy of the item.

61. The apparatus of claim 57, wherein the resources which manage consistency respond to a read operation of an item of data in the shared memory by generating a communication on the processor bus to cause a flush of a copy of the item from the processor store to the shared memory when the information store indicates that the processor store includes the copy of the item, and that the copy of the item has been modified in the processor store.

62. The apparatus of claim 57, wherein during a write operation by the processor to a copy of an item of data in the processor store, the processor store and the processor generate a communication across the processor bus, which causes the resources which manage consistency to update a corresponding entry in the information store to indicate the copy of the item of data has been modified in the processor store.

63. The apparatus of claim 50, wherein the data packets in transit in the network include header portions with communication protocol information.

64. The apparatus of claim 50, wherein the processor includes a second integrated circuit processing unit, and the processor store includes a cache on the second integrated circuit processing unit.

65. In a system for managing data flow among a plurality of I/O devices, including a first memory, which stores I/O data in transit between the plurality of I/O devices, a first processor including a first store for storing copies of I/O data from the first memory, a first communication channel coupled to the first processor, a second communication channel coupled to the plurality of I/O devices, an access controller coupled to the first communication channel, the second communication channel and the first memory for arbitrating accesses to the first memory by the first communication channel and the second communication channel, a method for enforcing a set of consistency rules between I/O data in the first memory and copies of the I/O data in the first store, comprising the steps of:

storing at the access controller identifying information about the copies of the I/O data in the first store;

receiving read and write operations to the first memory;

using the identifying information to determine whether to send communications to the first processor through the first communication channel to enforce the consistency rules in response to the read and write operations to the first memory; and sending communications across the first communication channel when necessary to enforce the set of consistency rules.

66. The method of claim 65, wherein the step of using identifying information to determine whether it is necessary to send communications to the first processor, determines to send communications to the first processor to invalidate a copy of an item of I/O data in the first store in response to a write operation on the second communication channel to a memory item in the first memory, when the identifying information indicates the first store includes the copy of the item of I/O data.

67. The method of claim 65, including the step of generating a communication from the first processor to the access controller across the first communication channel in order to update the identifying information to indicate a copy of an item of I/O has been moved into the first store.

68. The method of claim 65, wherein the step of using identifying information to determine whether to send communications to the first processor determines to send communications to the first processor to cause a flush of a copy of an item of I/O data from the first store to the first memory in response to a read operation to the item of I/O data in the first memory, when the identifying information indicates the first store includes the copy of the item of I/O data, and that the copy has been modified in the first store.

69. The method of claim 65, including the step of generating a communication from the first processor to the access controller across the first communication channel in order to update the identifying information to indicate a copy of an item of I/O data in the first store has been modified when the first processor writes to the item of I/O data in the first store.

70. The method of claim 65, wherein the I/O data in transit between the plurality of I/O devices includes network data packets including header portions with communication protocol information.

71. The method of claim 65, wherein:

communications across the second communication channel include I/O data in the form of network packets which include header portions with communication protocol information; and communications across the first communication channel include the header portions of the network packets in addition to control information and instructions used by the first processor.

72. The method of claim 65, wherein the first store of the first processor is a cache memory.

73. The method of claim 65, wherein the system for managing data flow includes a second processor coupled to the first communication channel including a second store for storing copies of the I/O data from the first memory, including the steps of:

storing at the access controller identifying information about copies of the I/O data from the first memory in the second store; and using the identifying information to determine whether to send communications to the second processor through the first communication channel to enforce the set of consistency rules in response to the read and write operations to the first memory across the second communication channel.

74. The method of claim 65, wherein the system for managing data flow includes a plurality of processors coupled to the first communication channel, including a plurality of associated stores for storing copies of the I/O data from the first memory, including the steps of:

storing at the access controller identifying information about the copies of the I/O data from the first memory in the plurality of associated stores; and using the identifying information to determine whether to send communications to the plurality of processors through the first communication channel to enforce the consistency rules in response to the read and write operations to the first memory across the second communication channel.

75. The method of claim 65, wherein the first processor is a microprocessor on a semi-conductor chip, and the first store is a cache on the microprocessor chip.

76. The method of claim 65, wherein the first processor includes an instruction cache.

77. The method of claim 65, wherein the system for managing data flow further includes a second memory coupled to the first communication channel, which stores control information and instructions used by the first processor to manage data flow between the plurality of I/O devices.

78. The method of claim 65, wherein the system for managing data flow further includes a cache coupled to the first communication channel.

79. The method of claim 65, wherein the method maintains consistency between the I/O data in the first memory, and copies of the I/O data in the first store of the first processor.

80. The method of claim 65, wherein the method minimizes the communications across the first communication channel to enforce the set of consistency rules between the I/O data in the first memory and copies of the I/O data in the first store of the first processor.

\* \* \* \* \*